ANALOGUE COMPUTER FOR LINEAR PROGRAMMING

Original Filed May 14, 1968 2 Sheets-Sheet 1

Inventor
WILLIAM JOHN NIBLOCK
By
Mason, Fenwick & Lawrence
Attorneys

ANALOGUE COMPUTER FOR LINEAR PROGRAMMING

Original Filed May 14, 1968 2 Sheets-Sheet 2

Inventor
WILLIAM JOHN NIBLOCK
By Mason, Fenwick & Lawrence
Attorney

United States Patent Office

Re. 27,672
Reissued June 12, 1973

27,672

ANALOGUE COMPUTER FOR LINEAR PROGRAMMING

William John Niblock, Castlebellingham, Ireland, assignor to Oeleg Limited, Dublin, Ireland Original No. 3,546,443, dated Dec. 8, 1970, Ser. No. 729,008, May 14, 1968. Application for reissue Sept. 1, 1971, Ser. No. 177,011
Claims priority, application Great Britain, May 17, 1967, 22,844/67
Int. Cl. G06g 7/34
U.S. Cl. 235—180 14 Claims

Matter enclosed in heavy brackets [ ] appears in the original patent but forms no part of this reissue specification; matter printed in italics indicates the additions made by reissue.

ABSTRACT OF THE DISCLOSURE

An analogue computer arranged for the solution of linear-programming problems by the method of steepest ascents solves the set of differential equations in the form $$\frac{dX_i}{dt}=-K_1(A_1f_{i1}+A_2f_{i2}+\ .\ .\ .\ +A_Nf_{iN})-K_2C_i$$

Figure 1:
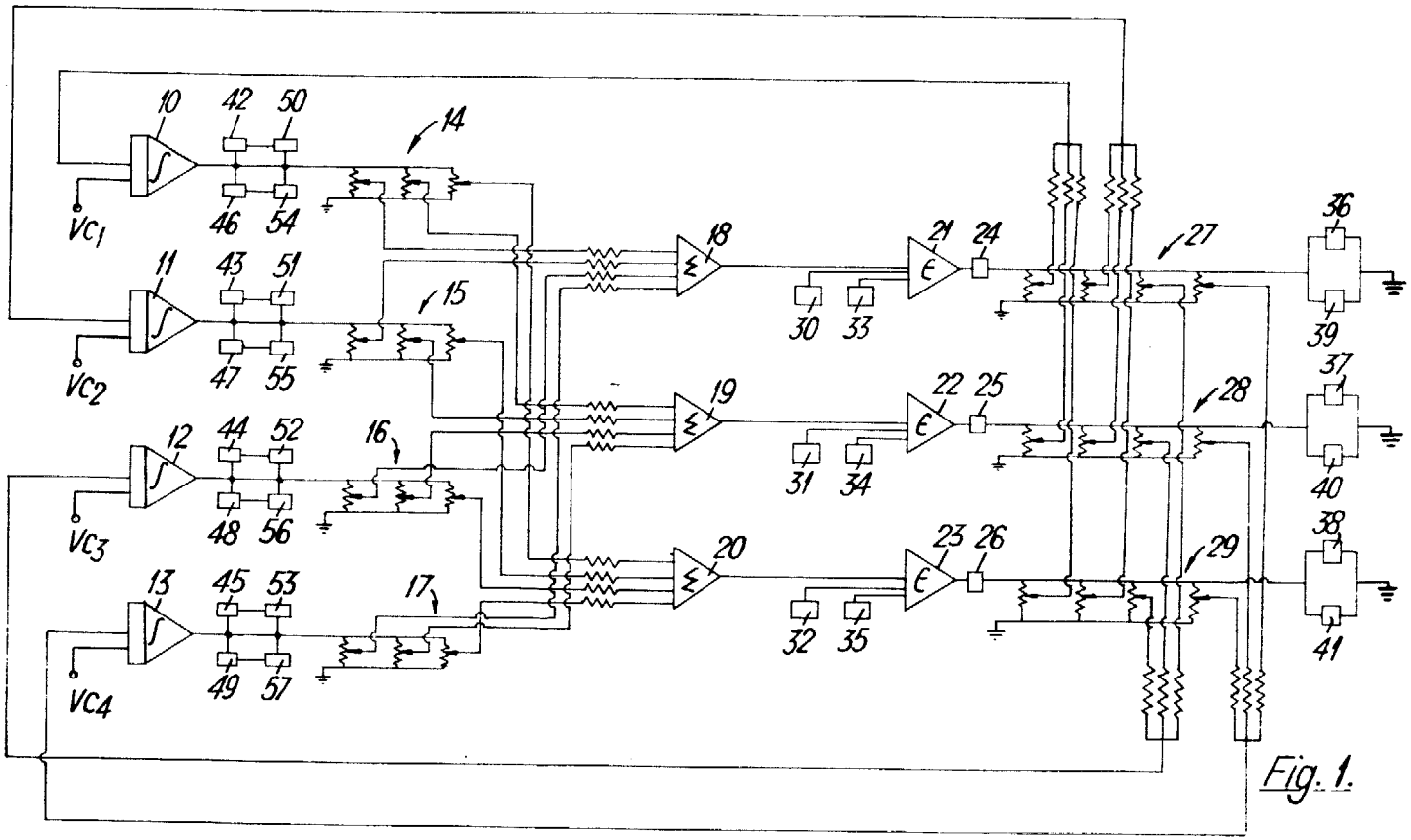

In order to optimise the value of an objective function which is represented by $C_i$. When the objective function is optimised the parameter $A_i$ is zero far all values of i and specific values of $X_i$ are determined. $A_i$ is zero when values of $$\sum_{i=1}^{N} f_{ij}$$

lie within predetermined limits. The invention provides defectors associated with each amplifier of the computer having limit-setting means whereby the operator can determine immediately if a limit has been set on the output signal from a specific amplifier and if the output signal therefrom is in fact constrained by that limit, by means of lamps forming part of each detector.

This invention relates to an analogue computer designed for the solution of so-called "linear programming" problems by the method of steepest ascents.

BACKGROUND TO THE INVENTION

The linear programming problem consists in solving a set of M linear equations (or inequations) in N variables of which the required solution will optimise a function called "the objective function".

The solution of generalised linear programming problems by the method of steepest ascents and arrangements for the simulation of this method on an analogue computer are described by Insley B. Pyne in the article entitled "Linear Programming on an Electronic Analogue Computer" published by Proc IEE, vol. 75, May 1956; in the book "Electronic Analogue Computers" (Second Edition) by Korn and Korn, commencing at page 147, and in the book "Analogue Computation and Simulation" by Roger R. Jenness.

In each of the aforementioned articles the general linear programming problem is considered in mathematical terms, and its solution by the method of steepest ascents is shown to consist in the solution of a set of simultaneous differential equations of the form $$\frac{dX_i}{dt}=-K_1(A_1f_{i1}+A_2f_{i2}+\ .\ +A_Nf_{iN})-K_2C \qquad (1)$$

where $K_1K_2$ are constants:

$X_i$ and $f_{ij}$ are variables $C_i$ is a parameter related to $X_i$ and $A_i$ is an "error" parameter related to $f_{ij}$ The problem consists of determining specific values of $X_i$ such that the values of $$\sum_{i=1}^{N} f_{ij}$$

lie within predetermined limits, under which conditions $A_i$ is related to $C_i$, is optimised. Typically the objective function is cost and the problem is optimised by achieving minimum cost.

One example of the linear programming problem which is described in an article entitled "Feed Formulation Computation," by Don Griffin, and published in "Instrument Practice," January 1967 is to determine the minimum cost of unit weight of a mixture of N constituents whose relative proportions by weight in the mixture are specified either exactly or within limits, the N constituents being contained in known proportions in M ingredients whose cost per unit weight is known. It is also required to determine the specific quantities of the M ingredients required in the mixture to achieve minimum cost.

In Equation 1 above $X_i$ would therefore represent the quantity of the $i^{th}$ ingredient present in the mixture, $f_{i1}$ would represent the quantity of the 1st constituent contributed by the $i^{th}$ ingredient, and $C_i$ the cost per unit weight of the $i^{th}$ ingredient.

In the above-mentioned articles by Pyne and by Griffin the arrangement of simulating the solution to a set of equations in the form of (1) above, consists of providing a bank of integrators in parallel each with a bank of potentiometers connected to its output. The output signal from one integrator represents a problem variable ($X_i$) or the amount of the $i^{th}$ ingredient present in the mixture, which ingredient has constituents ($f_{i1}$, $f_{i2}$, etc.) whose relative proportions are known and are set on the potentiometers connected to the pertaining integrator. Summing amplifiers are provided to sum the amount of each constituent $f_1$, $f_2$ in the mixture and the output of each summing amplifier is fed to an error amplifier to which signals representative of the permitted range of the pertaining constituent in the mixture are also fed. The output of the error amplifier is constrained to zero when the amount of the constituent ($f_1$ say) lies within the permitted range, and an error signal is produced if this condition is not satisfied. A bank of potentiometers is connected to the output of each error amplifier from which the percentages of the various constituents in the $i^{th}$ ingredient, the relative proportions of which are known, are taken and fed as a summed input to the integrator whose output represents the problem variable $X_i$. A second input is fed to each integrator which is representative of the cost of the pertaining ingredient. This input is obtained from a constant voltage source which is connected to the input of a variable gain amplifying device, and the output of this device, which represents the total cost of the mixture, is connected to a bank of potentiometers, one for each ingredient in the mixture, from which the voltages representative of the cost of the various ingredients are fed to the integrators.

In order to solve the problem the computer operator manually varies the gain of the variable gain amplifying device until such time as the output voltage therefrom is minimised, and the output voltage of each error amplifier lies within or on one of the specified limits.

In practice, it is desirable to identify those constraints which are limiting the achievement of an optimal solution, i.e. those constraint which if relaxed however slightly would enable further improvement in the objective function.

In practical linear programming problems the right hand side constants of the original equations from which Equation 1 above is derived are usually in the form of a fixed constant, in the case of a true equation, or on the form of limiting constants (i.e. maximum and/or minimum permitted values of the result) in the case of an inequation. In the solution of Equation 1 above these constants are represented by the function $$\sum_{i=1}^{N} f_{ij}$$

The minimum value of these constants may be zero and/or the maximum value may be infinity, without violating the generality of the previous statement. The facility of setting accurately such constants, whether fixed or limiting, and of imposing precise limits upon the values of the problem variables ($X_i$) on an analogue computer, constitutes one of the unsatisfactory parts of the existing state of the art. Furthermore, the practical linear programming problem involves the desirability of determining the identity of any limiting constraints since a practical solution of the problem may involve a relaxation of one or more constraints which have been arbitrarily imposed at the outset. It is therefore desirable that the problem may be treated dynamically, in the sense that before a final solution is accepted and the output of the integrators read out or printed out the problem itself may be modified to yield improvement in the objective funtcion.

SUMMARY OF THE INVENTION

It is an object of the present invention to provide an analogue computer for solving a linear programming problem by the method of steepest ascents, in which the constants may be set accurately and the limiting constraints may be readily identified and changed, if desired, during operations of the computer.

According to the present invention there is provided an analogue computer for solving a linear programming problem of M equations in N variables in order to optimise an objective function by the steepest ascents, said computer including:

- N electronic integrators each having (M+1) inputs;
- N banks of M potentiometers connected in parallel, the N banks being respectively connected to the outputs of the N integrators;
- M summing amplifiers each having N inputs, the outputs of each of the M potentiometers of the N banks being respectively connected to an input of the M summing amplifiers;
- M error amplifiers the inputs of which are respectively connected to the outputs of the M summing amplifiers;
- M banks of N potentiometers connected in parallel, the M banks being respectively connected to the outputs of the M error amplifiers and the M inputs of the N integrators being respectively connected to one of the N potentiometers in each of the M banks;
- Objective-function-representative means connected to the other input of each of said N integrators;
- Limit-setting means connected to at least one of the elements in the group consisting of the N integrators, the M summing amplifiers, and the M error amplifiers to constrain the solution of the problem to predetermined limits; and
- Detector means associated with said limit-setting means to indicate that a limit set by said limit-setting means has been reached.

DESCRIPTION OF THE PREFERRED EMBODIMENT

Figure 2:
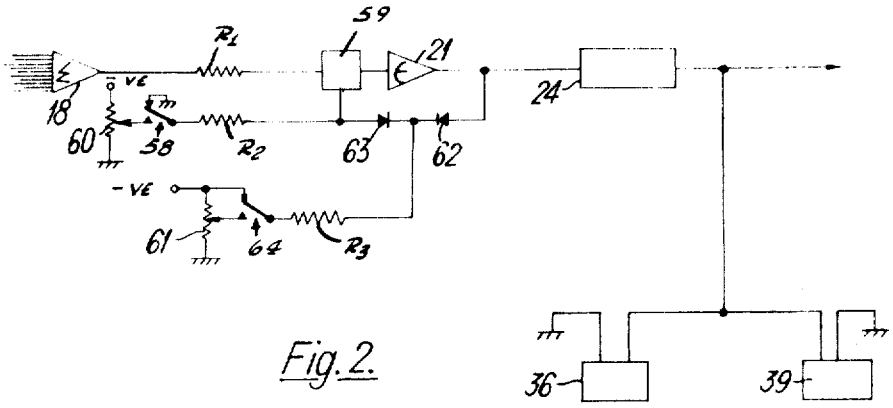
Figure 3:
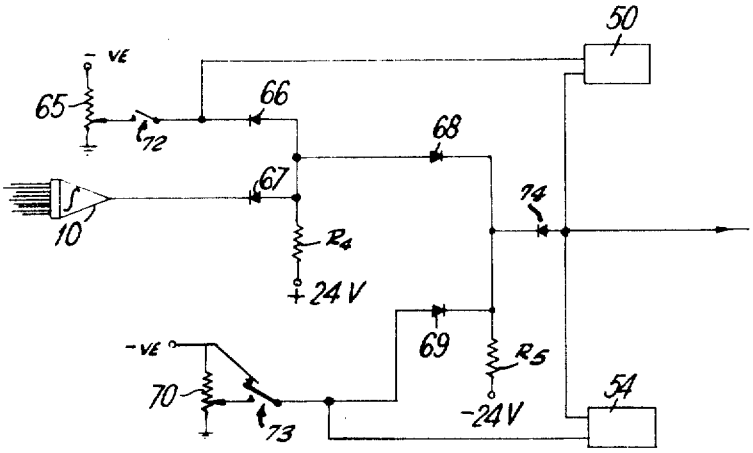

An embodiment of the present invention will now be described, by way of example, with reference to the accompanying drawings, wherein:

FIG. 1 is a schematic diagram of a computer according to the present invention, constructed to solve a particular linear programming problem;

FIGS. 2 and 3 each show part of FIG. 1 in greater detail.

In FIG. 1 of the drawings there is shown an analogue computer according to the present invention, and arranged to solve the problem of determining the proportions of each of four ingredients ($X_1$, $X_2$, $X_3$, $X_4$) required in a mixture of three constituents ($f_1$, $f_2$, $f_3$) whose relative proportions within the mixture are specified within upper and lower limits. Each of the four ingredients contains the three constituents in known proportions, known limits are imposed upon the maximum and minimum acceptable quantities of the ingredients in the mixture and the cost of each ingredient is known.

Four integrators 10, 11, 12 and 13 are provided, one representative of each ingredient and four potentiometer banks 14, 15, 16 and 17 are respectively connected to the outputs of the integrators. Each bank 14–17 has three potentiometers, one for each constituent in the mixture, and the outputs from the first potentiometer in each bank 14–17, which are respectively set to provide a signal representative of the percentage of the first constituent contributed to the mixture by the respective ingredient, are summed in an amplifier 18, the output voltage of which is representative of the total quantity of the first constituent ($f_1$) in the mixture. Similarly, the outputs from the remaining corresponding potentiometers in the banks 14–17 are summed in amplifiers 19, 20 to provide signals representative of the total quantity of the second ($f_2$) and the third ($f_3$) constituents in the mixture.

The outputs of the summing amplifiers 18–20 are respectively connected to the inputs of three error amplifiers 21, 22, 23, each of which has two other inputs, one representative of the minimum quantity of the constituent and one representative of the maximum quantity of the constituent acceptable in the mixture. These inputs are represented in block form by the means 30 and 33, 31 and 34, 32 and 35 for the amplifiers 21, 22 and 23 respectively.

The signal appearing at the output of the amplifier 21, as shown in FIG. 4, is greater than $+V_1$ volts if $f_1<V_A$, where $V_A$ is the lower limiting value set by the block 30; more negative than $-V_2$ volts if $f_1>V_B$, where $V_B$ is the upper limiting value set by the block 33; and, zero volts of $V_A<f_1<V_B$. If $f_1=V_A$ then the output signal lies between O and $+V_1$ volts, and if $f_1=V_B$ than the output signal lies between O and $-V_2$ volts.

Diode dead-zone networks 24, 25 and 26 are respectively connected to the outputs of the amplifiers 21, 22 and 23 so as to avoid the occurrence of an unwanted error signal resulting from amplifier offset, and respectively connected to the output of the dead-zone networks 24, 25, 26 is a bank of four potentiometers 27, 28, and 29, one potentiometer for each ingredient in the mixture. The outputs from the first potentiometer in each bank 27–29, which are respectively set to provide a signal representative of the percentage of the first, second and third constituents present in the first ingredient, are fed through summing resistors to the input of the integrator 10, and similarly the outputs of the second, third and fourth potentiometers in each bank 27–29 are fed through summing resistors to the inputs of the integrators 11, 12 and 13 respectively. In this way the proportions of the three constituents in each ingredient are summed.

The integrators 10–13 have a second input signal, Vc1, Vc2, Vc3, Vc4 respectively, provided from a voltage source, not shown, which is a signal representative of the cost of the ingredient represented by the output of the pertaining integrator. That is, the signal Vc1 is representative of the cost of unit weight of the first ingredient, the quantity $X_1$ of which is present in the mixture.

"Minimum limit reached" detectors 36, 37, 38 are respectively connected to the inputs of the potentiometer banks 27, 28 and 29 as are also "maximum limit reached" detectors 39, 40 and 41 respectively. The outputs of the integrators 10 to 13 respectively have problem variable minimum limit setting means 42, 43, 44 and 45 connected to them, together with problem variable maximum limit setting means, 46, 47, 48 and 49 likewise connected. Associated with these limit setting means 42 to 49 are "problem minimum limit reached" detector means 50, 51, 52 and 53, and "problem maximum limit reached" detector means 54, 55, 56 and 57.

The limit setting means 30 and 33 are shown in detail in FIG. 2 together with the associated elements 18, 21, 24, 36 and 39. A similar circuit is utilized for each error amplifier.

The output of the summing amplifier 18 is applied as a voltage of positive polarity with respect to the system earth to the input resistor $R_1$ of the error amplifier 21, and a voltage of negative polarity with respect to the system earth is applied by means of a potentiometer 60 to the input resistor $R_2$ through a switch 58. Both resistors $R_1$ and $R_2$ are connected to the summing junction 59 of the amplifier 21 of which the feedback path contains two diodes 62, 63 arranged back-to-back and having their cathodes connected together through a resistor $R_3$ and a switch 64 to the wiper of a potentiometer 61. The anode of the diode 63 is connected to the summing junction 59 and the anode of the diode 62 is connected to the output of the amplifier 21.

The potentiometers 60 and 61 respectively provide the minimum limit setting and maximum limit setting means for the first constituent $f_1$ in the mixture as represented by the output of the amplifier 18. Both potentiometers 60 and 61 are connected to a negative voltage source.

In operation, when the signal applied to the input resistor $R_1$ is less than that applied to the input resistor $R_2$ a positive output signal from the amplifier 21 is produced which causes the diode 62 to conduct thereby holding the cathode of the diode 62 at approximately the same voltage as the anode thereof so that the diode 63 is reverse biassed and does not conduct. When the signal applied to the input resistor $R_1$ equals that applied to the input resistor $R_2$ the output signal from the amplifier 21 is reduced to zero and both diodes 62 and 63 conduct thereby connecting the summing junction 59 directly to the output of the amplifier 21 and causing the output signal therefrom to be clamped at zero. The change of state of the diodes 63, 63 is in fact, quite sudden and is due to the voltage drop across the diode 62 (approximately 0.4 volt) which, when the output signal from the amplifier 21 tends to zero causes the cathode of the diode 63 to go negative with respect to the anode thereof, so that conduction results. When the diode 63 conducts the resistor $R_3$ is connected to the summing junction 59 and constitutes a third input to the amplifier 21. On further increase in the amplitude of the signal applied to the resistor $R_1$ the output signal from the amplifier 21 remains at zero until such time as the signal applied to the resistor $R_1$ exceeds the sum of the signals applied to the resistors $R_2$ and $R_3$. When this occurs a large negative output signal from the amplifier 21 results causing the diode 62 to be cut off. The value of this negative signal is greater, by design, than the maximum setting of the potentiometer 61, and in this condition the diode 63 conducts and the diode 62 is cut off.

It will therefore be understood from the foregoing that the maximum limit imposed on the signal applied to the input resistor $R_1$ of the amplifier 21 is provided by the sum of the signals applied to the input resistors $R_2$ and $R_3$, whereas the minimum limit imposed is provided by the signal applied to the input resistor $R_2$.

The possibility of an unwanted error signal resulting from amplifier offset is avoided by the use of the diode dead-zone network 24 following the error amplifier 21. This effectively blocks any output from the error amplifier 21 which is less than 1 volt, thereby allowing an input to the amplifier, due to noise or offset, of up to 1 millivolt, without producing an error signal to affect the integrators, since the gain of the error amplifier 21 is normally greater than 1,000.

The imposition of minimum and/or maximum limits upon the values of a problem variable as achieved as shown in FIG. 3 by means of a diode network, comprising diodes 66, 67, 68 and 69, to which the output of the integrator 10 representative of the given problem variable is applied as an input. The diodes 66 and 67 are arranged to form a first OR gate, the anodes of the two diodes being connected through a resistor $R_4$ to a voltage supply at +24 volts. The cathode of the diode 67 is connected to the output of the integrator 10 and the cathode of the diode 66 is connected through an isolating switch 72 to the wiper of a potentiometer 65 which is connected to a negative voltage source. The setting of the potentiometer 65 imposes a minimum limit for the problem variable and the first OR gates selects the more negative of the two inputs, with respect to the system earth. The output of the first OR gate is connected to the anode of the diode 68 which forms part of a second OR gate the other diode of which, diode 69, has its anode connected through a switch 73 to the wiper of a potentiometer 70 which is connected to a negative voltage source. The cathodes of the two diodes 68 and 69 are connected through a resistor $R_5$ to a voltage supply at −24 volts, and the output of the second OR gate is connected through a diode 74 to the potentiometer bank 14.

The setting of the potentiometer 70 imposes a maximum limit for the problem variable and the second OR gate selects the less negative of the two inputs thereto. Thus if the output signal from the integrator 18 is less, in amplitude, than that set on the potentiometer 65 the first OR gate will pass the signal applied by the potentiometer 65, and the second OR gate will also pass the signal applied by the potentiometer 65. If, however, the output signal from the integrator 18 is greater, in amplitude, than that set on the potentiometer the first OR gate will select the said output signal and the second OR gate will also select the said output signal provided it is less, in amplitude, than the signal provided by the potentiometer 70. If the said output signal is greater, in amplitude, than that provided by the potentiometer 70 the output signal applied to the potentiometer bank 14 will be that imposed by the potentiometer 70.

Thus the potentiometer 65 sets the minimum limit of the problem variable and the potentiometer 70 sets the maximum limit of the problem variable.

*In practice the solution to a linear programming problem is achieved rapidly provided at least one limiting condition is achieved in the error amplifiers, and a valid solution to the problem is achieved provided no limit set on the error signals is violated. Known computers which are adapted to the solution of a linear-programming problem have been provided with monitoring systems designed to alert the operator to the lack of one and the existence of the other of the above conditions. For example, the computer disclosed in the above-mentioned Don Griffin article has an arrangement which illuminates a blue lamp if constraints on the error signals are violated and a red lamp is illuminated if there is no error signal. These known computers however fail to enable the problem to be treated dynamically in the sense that they do not provide any automatic method of determining and identifying for the operator which limiting condition has been reached and is constraining the solution.*

The means whereby the linear programming problem may be treated dynamically consists of the limit detectors 36–41 and 50–57 each of which preferably but not exclusively includes a panel of lights wherein a pair of lights is provided for each limit imposable. The first of each pair of lights (hereinafter called the "limit set"

light), when lit indicates that the limit has been set, and the second of each pair of lights (hereinafter called "the limit reached" light), when lit indicates that the solution is in fact constrained by that limit.

As previously described the potentiometers 60, 61, 65 and 70 are respectively connected in circuit by the switches 58, 64, 72 and 75 each of which has a pole, not shown, which puts the "limit set" light of the pertaining panel in circuit when a limit according to the potentiometer setting is imposed in circuit. The second or "limit reached" light is illuminated when the limiting condition occurs in the solution. As shown in FIGS. 1 and 2 the two detectors 36 and 39 are connected to receive the signal output from the error amplifier 21 and to compare that signal with the system zero voltage or earth. If the signal from the error amplifier exceeds vectorially the system zero voltage one of the detectors 36, 39 operates its "limit reached" light; if the signal is vectorially less than the system zero voltage the other detector operated its "limit reached" light. If there is no signal output from the error amplifier neither detector operates, and the detectors 36, 39 are so constructed that a "limit reached" light which has been illuminated, is extinguished when the solution retreats from the limiting condition. The detectors 37 and 40, and 38 and 41 operate in a similar fashion in relation to the error amplifiers 22 and 23 respectively.

In the case of the minimum and maximum limits imposed upon the values of the problem variable represented by the output of the integrator 10, the detectors 50 and 54 compare the output of the second OR gate with the outputs of the problem variable limit-setting potentiometers 65 and 70 respectively. If the output of the second OR gate is equal to the output of the limit setting potentiometer 70 then the maximum limit detector 54 operates its "limit reached" light. If the output of the second OR gate is equal to the output of the potentiometer 65 then the minimum limit detector 50 operates its "limit reached" light.

The detectors 51, 55 and 52, 56, and 53, 57 operate in a similar fashion in relation to the integrators 11, 12 and 13 respectively.

Since any imposed limit may be removed instantly without disturbing the value set up for that limit, by switching the limit out of circuit, the effect of the removal of all or any of those limits which are seen from the lights to constrain the problem, and particularly the effect upon the objective function may be discovered simply by switching them out of circuit. Furthermore, while the solution is still dynamically maintained by the computer, any one or more limit potentiometer or potentiometers may be adjusted while both its constraining influence and its effect upon the objective function are monitored.

A limitation upon the practical usefulness of any analogue computer previously adapted to the solution of a linear-programming problem lies in the number of coefficient potentiometers, integrators and error amplifiers available to determine the solution to each of a range of problems. Since any one problem requires only a limited number of such units it is necessary either to reset coefficient potentiometers or to provide a sufficient number of such units to accommodate all such problems simultaneously.

In a modification of the present invention interchangeable modules are provided each of which contains all such units as are required to store all the information relating to one problem variable. For example, in FIG. 1 the problem variable represented by the output of the integrator 10 may be arranged in modular form by providing a module containing the integrator 10 (with its input resistors and feedback components) the potentiometer bank 14 and the first potentiometers of each of the banks 27, 28 and 29. A selection may then be made from the store of such set up modules (wherein the information relating to any particular problem variable is permanently retained) and the selected coefficient modules plugged into the computing circuitry of the computer. Considerable economy is then effected without loss of versatility.

I claim:

1. An analogue computer for solving a linear programming problem defined by M number of equations in N number of variables in order to optimise an objective function by the method of steepest ascents, said computer including:

N electronic integrators each having first input means for connection to M input signals and having a second input;

N banks of M [potentiometers] *coefficient setting means* connected in parallel, the N banks being respectively connected to the outputs of the N integrators;

M summing amplifiers each having N inputs, the outputs of each of the M [potentiometers] *coefficient setting means* of the N banks being respectively connected to an input of the M summing amplifiers;

M error amplifies the inputs of which are respectively connected to the outputs of the M summing amplifiers;

M banks of N [potentiometers] *coefficient setting means* connected in parallel, the M banks being respectively connected to the outputs of the M error amplifiers and the first input means of the N integrators being respectively connected to one of the N [potentiometers] *coefficient setting means* in each of the M banks;

variable objective-function-representative means representative of the objective function to supply input signals to the second inputs of said N integrators;

each respectively interconnected N integrator, M summing amplifier and M error amplifier forming a group and comprising elements of their respective group;

limit-setting means connected to *selected ones* [at least one] of the elements in at least one of said groups to constrain the solution of the problem within predetermined limits; and

*a plurality of* detector means *each including a visible indicator and* associated *respectively* with *different ones of* said limit-setting means, *such detector means being operable simultaneously* to indicate that a [predetermined] limit set by *any of the pertaining* [said] limit-setting means has been reached *and that the solution to the problem is being constrained by that or those particular limit or limits.*

2. An analogue computer according to claim 1, wherein *each* said detector means includes a first lamp which is connected to be illuminated when the limit set by [said] *the pertaining* limit-setting means has been reached.

3. An analogue computer according to claim 2, wherein *each* said detector means includes a second lamp which is connected to be illuminated when a limit is applied by said limit-setting means.

4. An analogue computer according to claim 1, wherein at least one of the M error amplifiers has limit-setting means connected thereto in the form of a first potentiometer connected through an input resistor to the summing junction of the error amplifier, and a second potentiometer connected through a further input resistor in series with a first diode to said summing junction, the anode of said first diode being connected to the summing junction, and a second diode being provided with its anode connected to the output of the amplifier and its cathode connected to the cathode of the first diode, said first and second potentiometers being capable of being connected to a voltage source to provide respectively minimum and maximum limit-setting signals.

5. An analogue computer according to claim 4, wherein said detector means is connected between the output of said error amplifier and system earth.

6. An analogue computer according to claim 4, wherein switches are provided to isolate said first and second potentiometers.

7. An analogue computer according to claim 1, including a diode dead-zone network connected intermediate the output of each error amplifier and the pertaining potentiometer bank of the M banks of N potentiometers.

8. An analogue computer according to claim 7, wherein at least one of the N integrators has limit-setting means connected to the output thereof in the form of first and second two-input OR gates, of which the first OR gate has one input connected to the output of the integrator and the other input connected to a first potentiometer, and the second OR gate has one input connected to the output of the first OR gate and the other input connected to a second potentiometer, the first and second potentiometers being capable of connection to a voltage source to provide respectively minimum and maximum limit-setting signals.

9. An analogue computer according to claim 8, wherein said detector means has two channels of which one is connected between the second input to the first OR gate and the output of the second OR gate, and the other is connected between the second input to the second OR gate and the output of the second OR gate.

10. An analogue computer according to claim 8, in which switches are provided to isolate said first and second potentiometers.

11. An analogue computer according to claim 1, including a frame carrying N releasably secured supporting members on each of which is mounted one of said N integrators, one of said N banks of M [potentiometers] *coefficient setting means* and M [potentiometers] *coefficient settings means,* one from each of said M banks of N [potentiometers] *coefficient setting means,* whereby the computer is of modular construction.

*12. An analogue computer according to claim 1, wherein each of said coefficient setting means is in the form of a potentiometer.*

*13. An analgue computer according to claim 1, wherein at least one of said coefficient setting means is in the form of a potentiometer.*

*14. An analogue computer according to claim 12, including a frame carrying N releasably secured supporting members on each of which is mounted one of said N integrators, one of said N banks of M potentiometers and M potentiometers, one from each of said M banks of N potentiometers, whereby the computer is of modular construction.*

References Cited

The following references, cited by the Examiner, are of record in the patented file of this patent or the original patent.

UNITED STATES PATENTS

| | | | |
|---|---|---|---|
| 3,443,078 | 5/1966 | Noronha et al. | 235—193 |
| 2,742,227 | 4/1956 | Bubb | 235—180 |
| 2,911,146 | 11/1959 | Lanneau et al. | 235—180 |
| 3,033,460 | 5/1962 | Marcy | 235—180 |
| 3,134,017 | 5/1964 | Burhans et al. | 235—180 |

OTHER REFERENCES

Harbert: Analogue Computer Techniques (part 1) The solution of simultaneous equations, Electronic Engineering, February 1960, pp. 74–77.

FELIX D. GRUBER, Primary Examiner

U.S. Cl. X.R.

235—184, 193